United States Patent [19]
Jansen

[11] Patent Number: 5,106,509
[45] Date of Patent: Apr. 21, 1992

[54] PROCESS FOR THE REMOVAL OF FLUORIDE FROM WASTE WATER

[75] Inventor: Cornelis W. Jansen, Amersfoort, Netherlands

[73] Assignee: DHV Raadgevend Ingenieursbureau B.V., Ex Amersfoort, Netherlands

[21] Appl. No.: 643,731

[22] Filed: Jan. 22, 1991

[30] Foreign Application Priority Data

Sep. 18, 1990 [NL] Netherlands ............ 9002056

[51] Int. Cl.$^5$ ............................................. C02F 1/58
[52] U.S. Cl. ................................. 210/715; 210/724; 210/915; 423/163
[58] Field of Search .......... 210/715, 717, 714, 724, 210/915; 423/163, 164

[56] References Cited

U.S. PATENT DOCUMENTS

| | | | |
|---|---|---|---|
| 4,028,237 | 6/1977 | Nishimura et al. | 210/915 |
| 4,226,710 | 10/1980 | Bruckenstein | 210/915 |
| 4,323,462 | 4/1982 | Bruckenstein | 210/915 |
| 4,764,284 | 8/1988 | Jansen | 210/715 |

FOREIGN PATENT DOCUMENTS

1200364 7/1970 United Kingdom ............ 210/715

*Primary Examiner*—Peter Hruskoci
*Attorney, Agent, or Firm*—Kane, Dalsimer, Sullivan, Kurucz, Levy, Eisele and Richard

[57] ABSTRACT

The invention relates to a process for the removal of fluoride from waste water in the form of a slightly soluble salt by mixing the waste water with a reagent. According to the invention the fluoride containing waste water is thoroughly mixed with the water soluble reagent at a suitable pH in a reactor of the fluidized bed type, which is provided with an appropriate seed material, on which the fluoride salt crystallizes out, whereby the thus obtained pellets comprising the seed material with the crystalline fluoride salt, is removed from and new seed material is added to the reactor from time to time. According to the present process as reagent $CaCl_2$ is used, whereas the pH is adjusted to an appropriate value.

3 Claims, 1 Drawing Sheet

PROCESS FOR THE REMOVAL OF FLUORIDE FROM WASTE WATER

The invention relates to a process for the removal of fluoride from waste water in the form of a slightly soluble salt by mixing the waste water with a reagent.

The removal of fluoride from waste water may for example be realized by mixing the fluoride containing waste water with for example calcium chloride ($CaCl_2$) whereby the calcium fluoride precipitates.

A process of this kind may for instance be carried out with the application of the so called Funda filter system, which consists of two reactor tanks and a separator tank. In the first reactor tank calcium chloride and an acid or lye are added to the waste water to be treated, whereby the fluoride precipitates in the form of calcium fluoride at a suitable pH. The hereby formed flocky precipitate is transferred to the second reactor tank, in order to promote the growth of the calcium fluoride flocks. Thereafter the thus treated calcium fluoride flocks are separated in the separator tank from the waste water in the form of a voluminous mud containing much water, which mud should be drastically freed from water prior to the storage, disposing of or the fluoride recovery therefrom.

It has been found that the waste water treated according to the known process still contains a too high concentration of solved fluoride. Usually the concentration of fluoride in the thus treated waste water for instance amounts to 20-100 ppm.

Moreover the known process is expensive, laborious and takes up much space.

It is an object of the invention to provide a process, by which the above-mentioned disadvantages are effectively removed.

For this purpose the process according to the invention is characterized in that the fluoride containing waste water is thoroughly mixed with the water soluble reagent at a suitable pH in a reactor of the fluidized bed type, which is provided with an appropriate seed material, on which the fluoride salt crystallizes out, whereby the thus obtained pellets, consisting of the seed material with the crystalline fluoride salt, is removed from and new seed material is added to the reactor from time to time.

The process according to the invention is particularly suitable for the removal of fluoride from waste water, whereas moreover the disadvantages of the known process are effectively removed.

The removal of fluoride according to the present invention takes place quickly, i.e. within a few minutes, whereas the concentration of fluoride in the treated waste water is below 20 ppb, which is considerably lower than with the known process.

Another advantage of the present process is that a pellet product is obtained with a very low water content of about 5%. The thus obtained pellet material may be used without having to be further freed from water for various industrial applications, among which for the production of HF.

Moreover because of the low water content the volume of the formed pellets is about a factor 50 lower than the sludge obtained according to the known process.

An essential aspect of the present process is that a fluidized bed of the seed material is used because of which an exclusive crystallization of the fluoride salt takes place onto the seed material.

According to the invention as water soluble reagent a calcium or magnesium containing solution, e.g. calcium chloride, is used.

The process according to the invention should take place in the reactor at a pH of 3-14.

The pH of the waste water in the reactor should be higher than 3, because otherwise the fluoride will form hydrogen fluoride.

The desired pH is adjusted with acid or lye.

According to the invention with advantage sand is used as seed material, preferably with a grain size of 0.1-0.3 mm.

It is observed, that the sand grains with the mentioned particle size of 0.1-0.3 mm may grow to pellets with a particle size of 1-3 mm, which pellets are removed from the reactor from time to time.

From the thus removed pellets the fluoride may be recovered for industrial applications.

The grown pellets which have been removed from time to time should be periodically replenished by new seeding material, in order to ensure the maintenance of a well functioning fluidized bed, which is essential for the present process.

Figure 1:
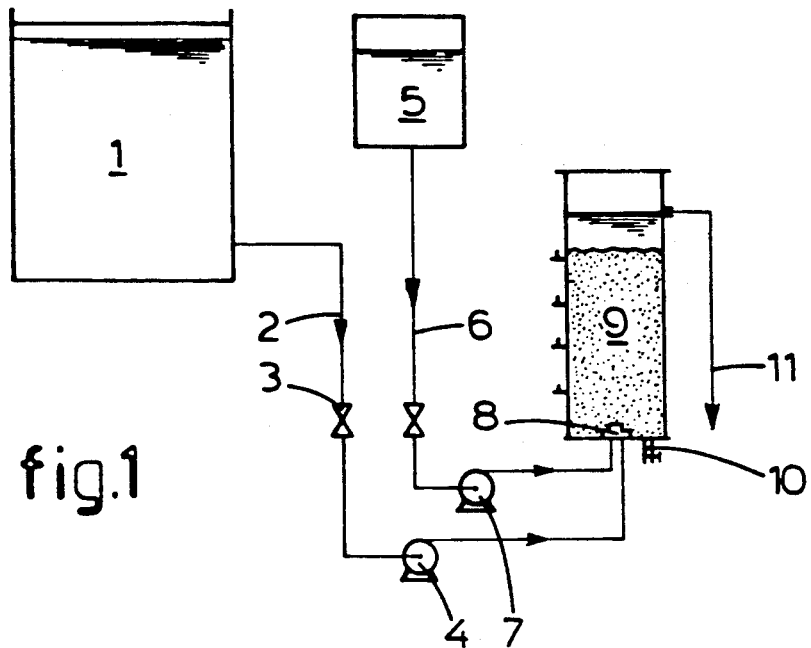
FIG. 1 is a flow diagram depicting an embodiment of the process.
Figure 2:
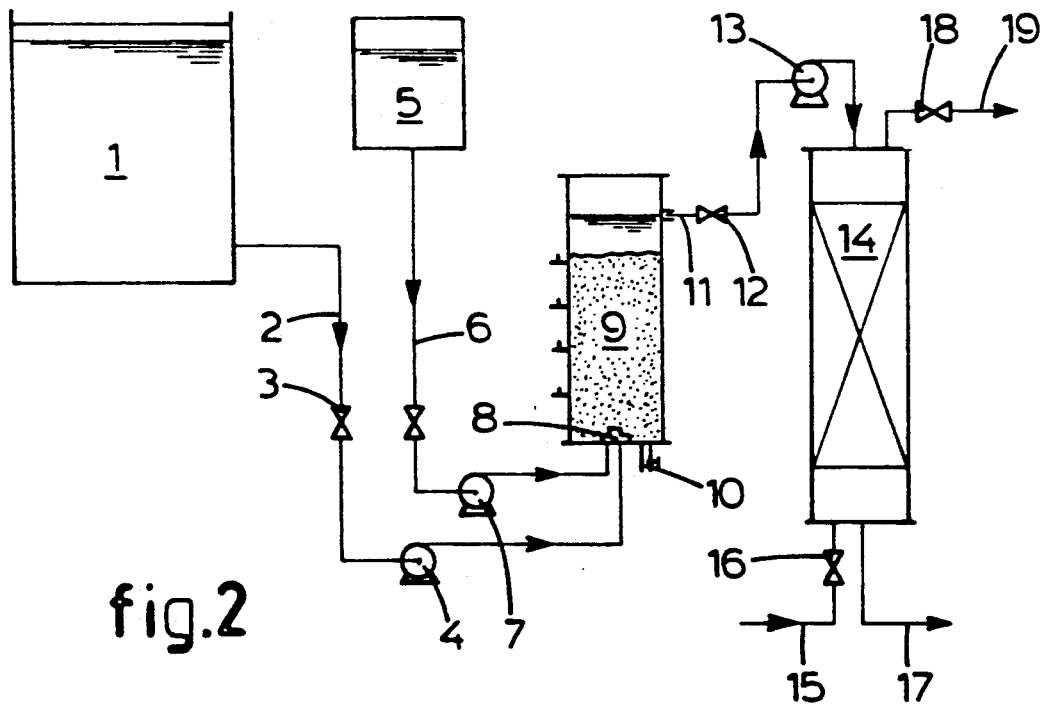
FIG. 2 is a flow diagram depicting an embodiment of the process.

The process according to the invention with which fluoride is removed, will now be elucidated with reference to FIGS. 1 and 2.

The waste water to be treated for instance has the following composition:
$F^- = 10-100.000$ ppm
$K^+ = 10-100.000$ ppm
$Na^+ = 10-100.000$ ppm
pH = 4-5
T = 5°-30° C.
SS = 10-200 ppm

EXAMPLE I (FIG. 2)

Waste water with the above mentioned composition was treated according to the process of the invention at ambient temperature, while using the apparatus shown in FIG. 1. The waste water was stored in tank 1 and from there led into the fluidized bed reactor 9 through conduit 2, valve 3 and pump 4. An aqueous $CaCl_2$ solution was also pumped from tank 5 through conduit 6 and pump 7 into reactor 9. In the case of sufficient pressure head of respectively the waste water and $CaCl_2$ the pumps 4 and 7 are superfluous. Both the waste water and the aqueous $CaCl_2$ solution were brought into the reactor 9 by means of the distributor 8, in such way, that they were divided evenly over the cross-section of the reactor and mixed intensively in the presence of the fluidized seed material. The superficial velocity in the reactor is so high (50-100 m/h), that the bed material present in the reactor 9, in this case sand grains with a particle size of 0.1-0.3 mm, was brought and maintained in fluidized condition.

The formed calcium fluoride crystallizes out at the surface of the sand grains, which sand grains hereby increase to a particle size of 1-3 mm. From time to time these pellets were removed from the reactor through discharge opening 10. Finally the thus treated waste water, which only contained 20-50 ppm F, was discharged through conduit 11.

Because of the fluctuating concentration fluoride in the waste water and in connection with the saving of reagentia the dosage of the calcium chloride was preferably regulated through an on-line analyzer.

EXAMPLE II (FIG. 2)

The procedure of example I was repeated on the understanding that the waste water treated according to the present invention was subjected to an post-treatment in a sand-filter prior to disposal.

Because of the occurring friction of the sand grains, which are covered with calcium fluoride, in the reactor calcium fluoride grit may be formed. This grit may be carried along in suspended form with the treated waste water, which may not be desired. In order to prevent this, advantageously use was made of a filter column 14. The thus treated waste water with the grit, if any, present therein, was led in the filter column 14 through conduit 11, valve 12 and pump 13, which filter column was filled with sand with a diameter of 0.5-0.6 mm or, in connection with a better pressure build-up, with a mixture of anthracite with a particle size of 0.6-1.6 mm and sand with a particle size of 0.4-0.8 mm.

After passing through the filter column 14 the filtered waste water was discharged through conduit 17. The thus treated waste water has a fluoride content of 5-10 ppm and in addition is free from the said grit.

The filter column 14 may be rinsed from time to time through conduit 15 and valve 16, whereby the rinsing water is discharged through conduit 19 and valve 18.

Alternatively a similar filter may in addition be placed between the neutralization tank 1 and the reactor 9 for collecting solid components present in the waste water to be treated before the waste water arrives in the reactor 9.

I claim:

1. A process for the removal of fluoride from waste water in the form of a substantially insoluble salt by mixing the waste water with a water soluble reagent, comprised of the steps of thoroughly mixing the fluoride containing waste water with the water soluble calcium reagent at a pH in the range of 3 to 14 in a fluidized bed reactor, which is provided with a seed material comprising sand having an effective grain size to cause calcium fluoride to exclusively crystallize onto said seed material and form pellets consisting essentially of the seed material and the crystallized calcium fluoride, and removing treated waste water and said pellets from said reactor.

2. Process according to claim 1, wherein the water soluble calcium reagent is $CaCl_2$.

3. Process according to claim 1, wherein sand with a grain size of 0.1-0.3 mm is used as the seed material.

* * * * *